Feb. 8, 1938.   R. C. JIMÉNEZ   2,107,443
HEADLIGHT FOR AUTOMOBILES
Filed April 21, 1936   3 Sheets-Sheet 1

INVENTOR
RAMON C. JIMENEZ
BY
Peter M. Boesen
ATTORNEY

Feb. 8, 1938.　　　　R. C. JIMÉNEZ　　　　2,107,443
HEADLIGHT FOR AUTOMOBILES
Filed April 21, 1936　　　　3 Sheets—Sheet 2
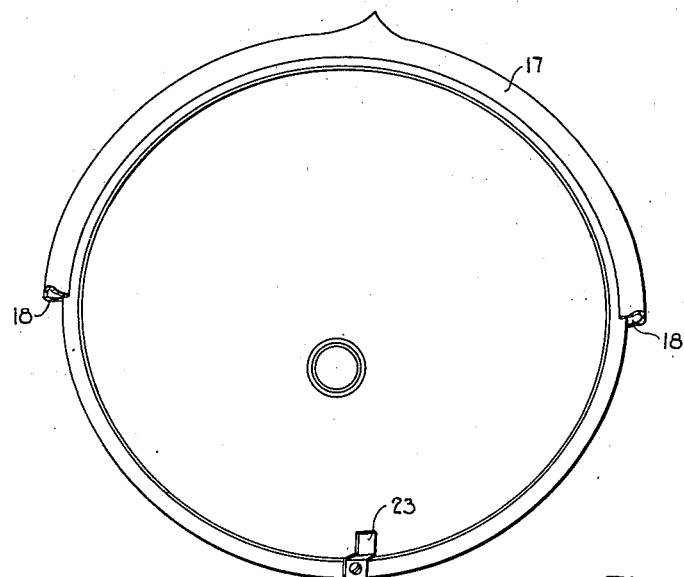
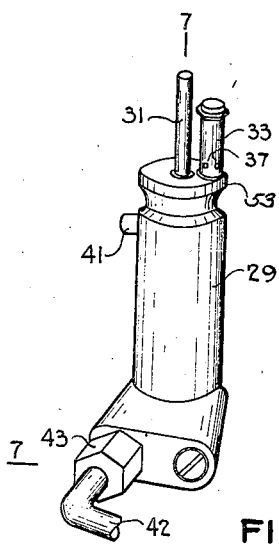
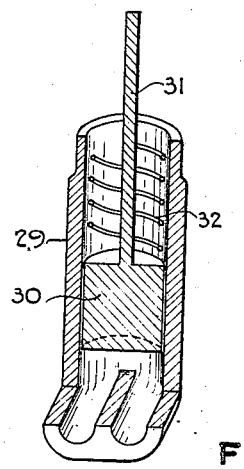
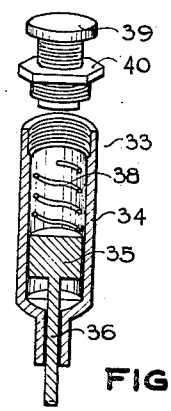
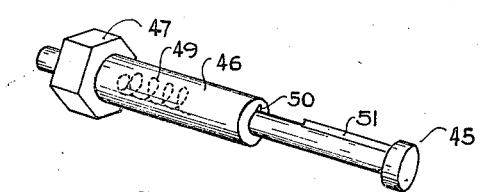
INVENTOR
RAMON C. JIMENEZ
BY
ATTORNEY Feb. 8, 1938.   R. C. JIMÉNEZ   2,107,443
HEADLIGHT FOR AUTOMOBILES
Filed April 21, 1936   3 Sheets-Sheet 3

INVENTOR
RAMON C. JIMENEZ
BY
ATTORNEY

UNITED STATES PATENT OFFICE 2,107,443

HEADLIGHT FOR AUTOMOBILES

Ramón Castro Jiménez, Boston, Mass.

Application April 21, 1936, Serial No. 75,618

3 Claims. (Cl. 240—41.6)

This invention relates to new and useful improvements in automobile headlights, and it has for its object to provide a device, whereby an automobile may safely travel over any road, whether even or steep, such as in hilly country, as my device, when manipulated, will readily adjust the headlights to the position desirable in view of the sloping of the road traveled.

Incidentally, no dimming of the headlights is necessary with the use of my device.

As the construction of my device is comparatively simple, the cost of manufacturing the same should be proportionately low.

With the above and other objects in view, this invention consists of the novel features of construction, combination, and arrangement of parts, hereinafter fully described, claimed and illustrated in the accompanying drawings forming part of this specification, and in which similar characters of reference indicate corresponding parts in all views, and in which:

Figure 3 is a front elevational view of the reflector, with the lens removed, and showing retained the upper rim portion of the reflector, and, upon the lower part of the latter, a catch for holding the lens in place.

Figure 6 shows a cylinder for gas pressure, or suction from the motor, according to the manner desired.

Figure 7 is a transverse sectional view taken on the line 7—7 in Figure 6.

Figure 8 is a transverse sectional view of a vent-valve, showing in and forming part of the cylinder illustrated in Figure 6.

Figure 10 shows the valve proper, as illustrated in Figure 9, detached.

Referring more particularly to the drawings, 11 indicates a headlight; the latter comprising a casing, or shell 12 formed with a hinged door 13 upon the rear thereof; said door has an aperture 14 therein for the escape of the fumes from the gas pressure.

Figure 2:
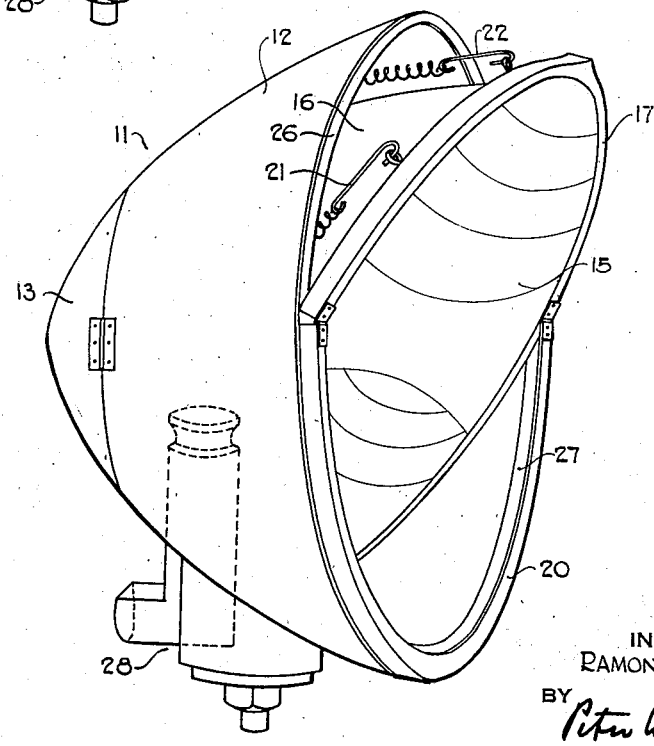
Figure 2 is a similar view, showing the lens and reflector in tilted position.

Upon the front thereof said headlight has arranged the usual lens 15, which is mounted on the reflector 16, as shown especially in Figure 2. Thus the said lens is secured to the reflector 16 by means of the rim section 17, which latter is normally solidly attached to said reflector by means of screws, and is removable whenever it is desired to clean the reflector inside or change the bulb. The said rim section 17 is formed with a groove 18, 18 at each end thereof, as may be seen especially in Figure 3, said grooves are made to receive therein in a sliding manner studs 19, 19, shown in Figure 5, and formed upon the lower rim portion 20, whereby the reflector and lens may swing or move forward, as shown in Figure 2, with the grooves 18, 18 and studs 19, 19 forming the pivotal support and guide for said movement of the reflector and lens.

In order properly to control the movement of the reflector and lens, spring actuated hooks 21, 21 regulate the movement of said reflector and lens in a vertical position, whereas a spring actuated hook 22 regulates the movement of said reflector and lens in a horizontal position, said hooks pulling the latter back to normal position, when the slanting movement imparted to said reflector by means of a pump action, ceases. The said hooks are arranged between the shell and the rim portion of the reflector. The lens 15 is secured to the reflector by means of the rim section 17 and a catch 23.

Figure 4:
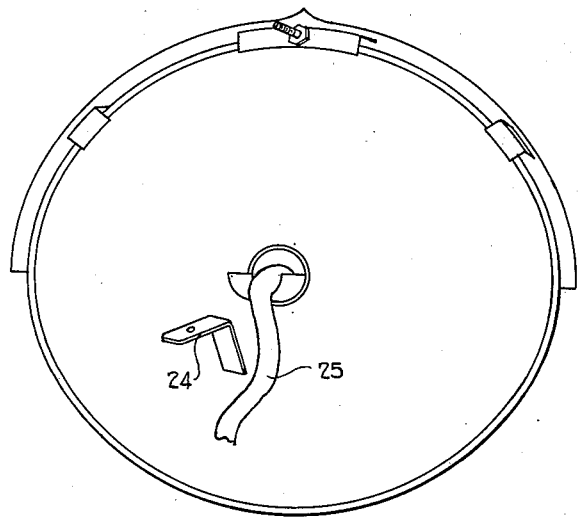
Figure 4 is an elevational view illustrating the back of the reflector proper.

Upon the back of the reflector is arranged a bracket 24, as shown in Figure 4, the purpose of which is to cooperate with a pump, or cylinder, as will be hereinafter described, in order to move the reflector into a slanting position.

The bulb in the reflector has the usual electric connection, casually indicated at 25.

In order to prevent breakage of the lens and the filaments of the bulb in the reflector during the manipulation of the latter, and also to prevent water from entering into the shell, rubber gaskets have been mounted, one 26 between the shell and the rim 17 of the reflector, and the other 27 between the rim 20 and the lens.

Figure 1:
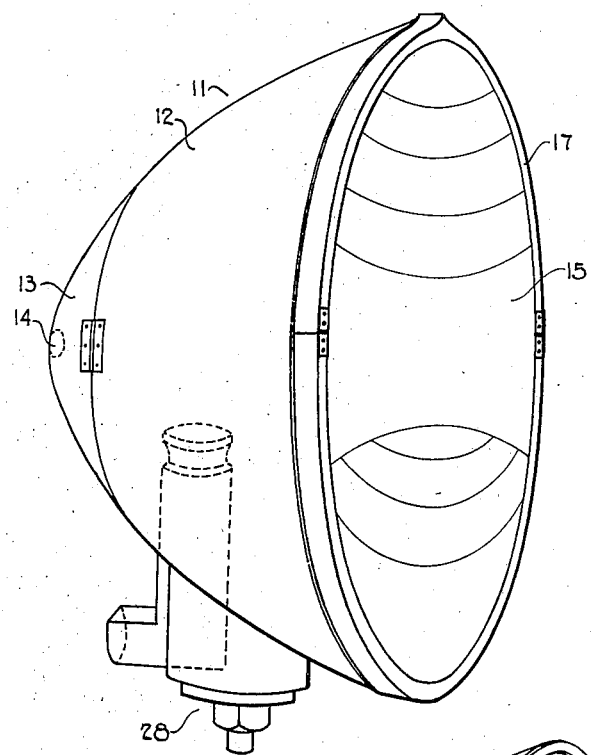
Figure 1 is a side elevational view of my device.
Figure 5:
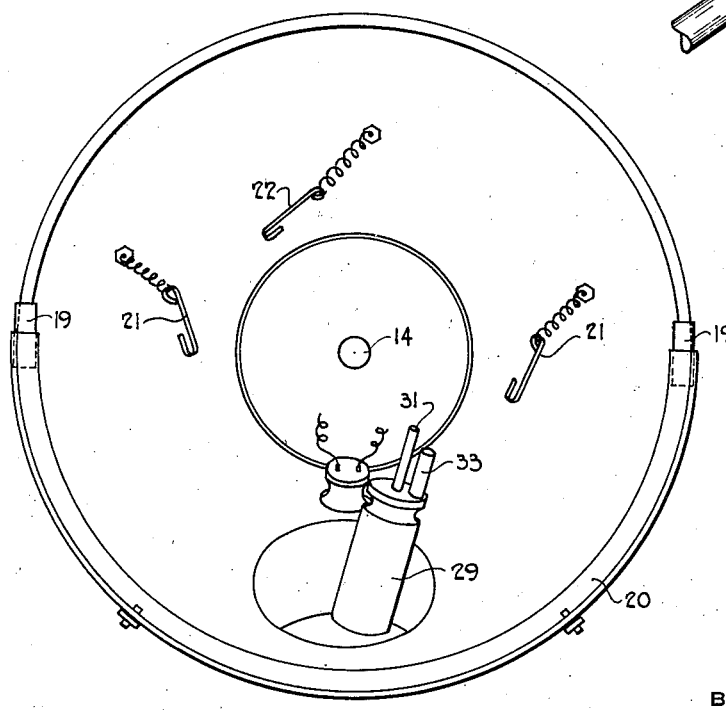
Figure 5 shows the inside of the reflector shell, or casing, with the lower portion of the rim attached thereto; the reflector itself having been removed.

Upon the back surface of the shell and underneath the latter is arranged an attachment 28, as may be seen in the Figures 1, 2 and 5. Said attachment comprises a cylinder 29, and piston 30 mounted in the latter; said piston may be actuated by compression or suction, and has a stem 31 mounted thereon and projecting through the top of the cylinder.

A spring 32 is mounted upon the stem 31 in order to force the piston down, when the compression or suction ceases to act upon the latter;

the cylinder has its top closed by means of a cap 53 screwed on to the latter.

When the piston is ascending, the stem 31 will act upon the bracket 24 secured to the rear surface of the reflector, and cause the latter to tilt.

In the cylinder 29 is mounted a vent-valve 33, shown especially in Figure 8; said vent-valve comprises a cylinder 34 and a piston 35 with a stem 36 mounted upon the latter. When the piston 30 due to compression or suction moves upward, said piston 30 will, when it approaches the top of the cylinder 29, engage the stem 36, which projects downwardly through the cylinder 34, and by pushing said stem 36 and piston upward, relieve the air pressure or suction, when said piston passes the vents 37, shown in Figure 6.

The vent-valve 33 has a spring 38 mounted therein for the purpose of graduating the pounds of pressure or suction to be exerted relative to the piston. By mounting springs of different tensions in the cylinder, the pressure-pounds may thus be varied or graduated.

The spring 38 is adjusted by means of a screw bolt 39 acting upon the nut 40.

In case it is desired to use the suction, a pipe 42 is disconnected from the compression inlet 43 and connected to the suction inlet 41; in this latter event, the pipe 44 has to be disconnected from the compression of the motor, and connected to the suction of the latter.

Figure 9:
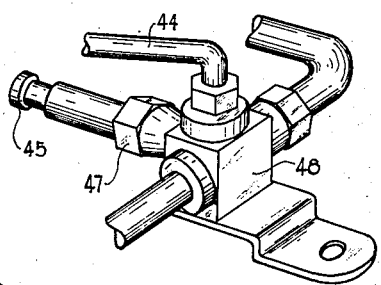
Figure 9 shows a connecting joint for attachment to the dash-board of an automobile, illustrating therein the operating valve.

The connecting joint for the pipes, as shown in Figure 9, from the motor to the cylinder of the headlight has a hand valve 45, which upon manipulation may cause the effect of compression or suction, respectively, relevant to the cylinder for the purpose of tilting the reflector, as hereinbefore described.

In Figure 10 is illustrated the hand valve 45, which comprises a cylinder 46 with a nut 47 forming an integral part therewith, said nut being screwed into the section 48 shown in Figure 9.

In the cylinder 46 is mounted the actual hand valve 45, which latter is actuated by a spring 49 disposed in said cylinder, the latter has been formed with a longitudinal slot 50 therein adapted during manipulation of said hand valve to receive a ridged portion 51 upon the latter.

Thus during operation of the device, and when it is desired to utilize the compression, the valve 45 is withdrawn so that the ridge 51 upon the latter is out of alignment with the groove 50 in the cylinder 46.

With this device may be used high candle power bulbs; at the same time by duly manipulating the device, it will, as formerly stated, not be necessary to dim the lights.

It is obvious that changes may be made in the form, construction and arrangement of the several parts, as shown, within the scope of the appended claims, without departing from the spirit of the invention, and I do not therefore wish to limit myself to the construction and arrangement shown and described herein.

What I claim as new, and desire to secure by Letters Patent of the United States, is:—

1. An automobile headlight comprising a casing, a reflector, a lens mounted in the latter, a semi-annular rim portion, a catch securing said lens to the reflector, said semi-annular rim being formed with grooves in each end thereof, a counterpart to said semi-annular rim being integrally secured to the casing, said counterpart being at its upper ends provided with pivots therein adapted to engage the grooves in the first said semi-annular rim portion, a bracket secured to the lower rear surface of the reflector, a bolt acting upon said bracket for tilting the reflector, and spring actuated hooks connected between the casing and the reflector, and adapted to move the reflector to its normal position, when it is not urged into a tilting position.

2. An automobile headlight comprising a casing, a reflector pivotally mounted in the latter, a lens arranged in said reflector, a semi-annular rim portion, a catch securing said lens to the reflector, said semi-annular rim being formed with grooves in each end thereof, a counterpart to said semi-annular rim being integrally secured to the casing, said counterpart being at its upper ends provided with pivots therein adapted to engage the grooves in the first said semi-annular portion, a bracket integrally secured to said reflector, an attachment comprising a cylinder arranged upon the lower surface of the casing, a rod mounted upon a piston in the cylinder and adapted to act upon said bracket in tilting the reflector, and a vent valve mounted in said cylinder, pipes for connecting the latter to the motor of a car for compression or suction, and a valve having an operating handle for controlling the means for manipulating said rod.

3. An automobile headlight comprising a casing, a reflector, a lens mounted in the latter, a semi-annular rim portion, a catch securing said lens to the reflector, said semi-annular rim being formed with grooves in each end thereof, a counterpart to said semi-annular rim being integrally secured to the casing, said counterpart being at its upper ends provided with pivots therein adapted to engage the grooves in the first said semi-annular rim portion, a bracket secured to the lower rear surface of the reflector, an attachment comprising a cylinder and arranged upon the lower surface of the casing, a rod mounted in said cylinder and adapted to act upon said bracket in tilting the reflector, and spring actuated hooks arranged between the casing and said reflector for securing the latter in position relative to the casing.

RAMÓN CASTRO JIMÉNEZ.